United States Patent [19]

Inoue et al.

[11] Patent Number: 4,485,206
[45] Date of Patent: Nov. 27, 1984

[54] OIL-RESISTANT, ROOM TEMPERATURE-CURABLE ORGANOPOLYSILOXANE COMPOSITION

[75] Inventors: Yoshio Inoue; Takehide Okami, both of Gunma, Japan

[73] Assignee: Shin-Etsu Chemical Co., Ltd., Tokyo, Japan

[21] Appl. No.: 546,054

[22] Filed: Oct. 27, 1983

[30] Foreign Application Priority Data

Oct. 29, 1982 [JP] Japan ................... 57-190383

[51] Int. Cl.³ .............................................. C08K 5/35
[52] U.S. Cl. ................................... 524/719; 524/723; 524/728; 524/783; 524/787; 525/477
[58] Field of Search ............... 525/477; 524/719, 723, 524/783, 787, 728

[56] References Cited

U.S. PATENT DOCUMENTS 3,696,127  10/1972  Matherly .......................... 524/783

Primary Examiner—Melvyn I. Marquis
Attorney, Agent, or Firm—Toren, McGeady and Stanger

[57] ABSTRACT

The invention provides a room temperature-curable organopolysiloxane composition comprising (a) a diorganopolysiloxane terminated at both molecular chain ends with silanolic hydroxy groups, (b) a methylpolysiloxane composed of monofunctional siloxy units $Me_3SiO_{\frac{1}{2}}$ tetrafunctional siloxane units $SiO_2$ in a specified molar ratio, (c) an organosilane or organopolysiloxane having at least three hydrolyzable groups bonded to the silicon atom(s) per molecule, (d) oxide, carbonate or hydroxycarbonate of zinc, and (e) a thiazole, thiuram or dithiocarbamate compound. The composition is curable by standing in air into a rubbery elastomer which is highly resistant against oils, e.g. engine oils and gear oils in automobiles, even at elevated temperatures.

11 Claims, 1 Drawing Figure

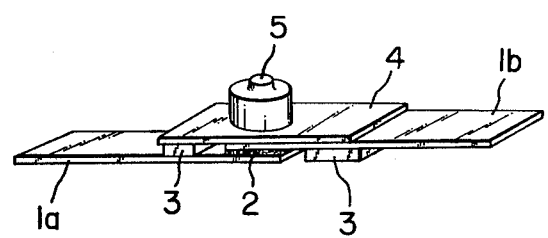

OIL-RESISTANT, ROOM TEMPERATURE-CURABLE ORGANOPOLYSILOXANE COMPOSITION

BACKGROUND OF THE INVENTION

The present invention relates to a novel room temperature-curable organopolysiloxane composition or, more particularly, an organopolysiloxane composition capable of giving a highly oil resistant rubbery elastomer by curing at room temperature.

Needless to say, oil resistance of the material is one of the most important requirements for gaskets, packings and the like made of cork, an organic rubber, asbestos and the like when such parts are used in various machines or, in particular, as a sealing material around automobile engines. These conventional materials are not always satisfactory due to not only the insufficient sealing performance but also the inconvenience that they should be manufactured in a preshaped form adaptable to each part. Therefore, these conventional materials are under continuous replacement with so-called formed-in-place gaskets (FIPG) by use of a room temperature-curable silicone rubber to give great advantages in respect of the good workability, hermetic sealability and heat resistance. A problem recently encountered with such FIPG formed of an organopolysiloxane composition and used in automobiles, however, is the degradation of the cured silicone rubber in the course of long-term use at elevated temperatures to cause oil leakage which is also partly due to the trend that the gear oils used in the transmissions and the like of modern automobiles is a low-viscosity multigrade one with admixture of a large amount of an extreme-pressure additive in compliance with the requirement of reduced fuel consumption.

SUMMARY OF THE INVENTION

It is therefore an object of the present invention to provide a novel and improved room temperature curable organopolysiloxane composition capable of giving a rubbery elastomer having high resistance against oils in automobiles even after prolonged use in contact therewith at elevated temperatures.

The oil-resistant, room temperature-curable organopolysiloxane composition of the invention comprises:

(a) 100 parts by weight of a diorganopolysiloxane having a degree of polymerization of at least 5 and terminated at both molecular chain ends each with a hydroxy group directly bonded to the terminal silicon atom;

(b) from 2 to 30 parts by weight of an organopolysiloxane composed of monofunctional siloxy units expressed by the general formula $R_3SiO_{\frac{1}{2}}$, in which R is a substituted or unsubstituted monovalent hydrocarbon group, e.g. methyl, and tetrafunctional siloxane units expressed by the formula $SiO_2$ in a molar ratio of 0.5:1 to 1:1;

(c) from 0.5 to 30 parts by weight of an organosilane or an organopolysiloxane having, in a molecule, at least three hydrolyzable groups bonded to the silicone atom or atoms;

(d) from 2 to 200 parts by weight of an inorganic zinc compound in a powdery form selected from the class consisting of zinc oxide, zinc carbonate and zinc hydroxycarbonate; and (e) an organic sulfur compound selected from the class consisting of thiazole compounds, thiuram compounds and dithiocarbamate compounds in an amount up to 20 parts by weight or, preferably, from 0.1 to 20 parts by weight.

BRIEF DESCRIPTION OF THE DRAWING

The FIGURE is a perspective illustration of the method for the determination of the shearing adhesive strength of the inventive composition.

DETAILED DESCRIPTION OF THE PREFERRED EMBODIMENTS

Following is a description of each of the components in the inventive organopolysiloxane composition which is imparted with excellent oil resistance at high temperatures by virtue of the admixture of the zinc compound as the component (d) or, in particular, by virtue of the unique combination of the zinc compound as the component (d) and the organic sulfur compound as the component (e).

In the first place, each of the components (a), (b) and (c) is in itself well known in the art of silicones and the crosslink formation between the terminal hydroxy groups in the component (a) and the hydrolyzable groups in the component (c) by the hydrolysis-condensation reaction in the presence of atmospheric moisture is the well-established mechanism involved in the curing of a class of room temperature-curable organopolysiloxane compositions to give a rubbery elastomer.

The component (a) in the inventive composition is an $\alpha,\omega$-dihydroxy diorganopolysiloxane typically represented by the general formula $HO\text{-}(SiR_2\text{---}O)_{\overline{n}}OH$, in which R is a substituted or unsubstituted monovalent hydrocarbon group and n is a positive integer. Each of the hydrocarbon groups R is independently selected from the class consisting of alkyl groups, e.g. methyl, ethyl and propyl groups, cycloalkyl groups, e.g. cyclohexyl group, alkenyl groups, e.g. vinyl and allyl groups, and aryl groups, e.g. phenyl and tolyl groups, as well as those substituted groups obtained by the partial substitution of halogen atoms or other substituents for the hydrogen atoms in the above named hydrocarbon groups. The suffix n gives the so-called degree of polymerization and, in the invention, the value of n should be at least 5 in order that the diorganopolysiloxane may have an adequately high viscosity, In particular, the diorganopolysiloxane as the component (a) should have a viscosity in the range from 25 to 500,000 centistokes or, preferably, from 1000 to 100,000 centistokes at 25° C. The method for the preparation of such an $\alpha,\omega$-dihydroxy diorganopolysiloxane is well known in the art of silicones and not described here.

The component (b) is an organopolysiloxane composed of the monofunctional organosiloxy groups $R_3SiO_{\frac{1}{2}}$ and the tetrafunctional siloxane units $SiO_2$ in a specified molar ratio. The organic group denoted by R in the organosiloxy group may be selected from the same class of the substituted or unsubstituted monovalent hydrocarbon groups as given before for the hydrocarbon groups R in the component (a). Preferably, the group R in this component (b) is a methyl group. The organopolysiloxane suitable as the component (b) can be readily prepared by the co-hydrolysis and co-condensation reaction of, for example, trimethylchlorosilane and sodium silicate or ethyl orthosilicate, the former giving the monofunctional units $Me_3SiO_{\frac{1}{2}}$ where Me is a methyl group and the latter giving the tetrafunctional units $SiO_2$.

It is essential in the invention that the molar ratio of the above mentioned monofunctional units to the tetrafunctional units in the component (b) is in a specified range of 0.5:1 to 1:1. An organopolysiloxane having the molar ratio smaller than 0.5:1 is poorly compatible with the component (a) in addition to the decreased rubbery elasticity of the cured product obtained by room temperature curing of the composition. When the molar ratio is larger than 1:1, on the other hand, the effect of oil resistance improvement in the cured composition may not be as high as desired. The amount of this component (b) in the inventive composition is limited in a specified range relative to the component (a) since no sufficient improvement can be obtained in the oil resistance of the cured composition with admixture of the component (b) in an amount smaller than 2 parts by weight while the rubbery elasticity of the cured composition may be decreased by the admixture of the component (b) in an amount larger than 30 parts by weight per 100 parts by weight of the component (a).

The component (c) in the inventive composition serves as a crosslinking agent for the component (a) and is an organosilane or an organopolysiloxane having at least three hydrolyzable groups per molecule. The hydrolyzable group is hydrolyzed by the atmospheric moisture into a silanol group which is condensed with the terminal silanol group in the component (a) to form a siloxane linkage. Suitable hydrolyzable groups include alkoxy groups, e.g. methoxy, ethoxy, propoxy, isopropoxy and butoxy groups, organoketoxime groups, e.g. acetoxime and butanonoxime groups, hydrocarbyl-substituted amino groups, e.g. dimethylamino, diethylamino and cyclohexylamino groups, organoamido groups, e.g. N-methyl acetamide group, dihydrocarbyl aminoxy groups, e.g. dimethyl aminoxy and diethyl aminoxy groups, alkenyloxy groups, e.g. isopropenyloxy group, and the like. It is of course optional that two kinds or more of the above named hydrolyzable groups are contained in one and the same molecule of the organosilane or organopolysiloxane.

Several of the examples of the organosilane having at least three hydrolyzable groups per molecule include: alkoxy-containing silanes such as methyl trimethoxysilane, vinyl trimethoxysilane, methyl triethoxysilane, vinyl triethoxysilane, ethyl orthosilicate, propyl orthosilicate and the like; alkenyloxy-containing silanes such as methyl tripropenyloxysilane, vinyl triisopropenyloxysilane and the like; oxime silanes such as methyl tris(acetonoxime)silane, methyl tris(butanonoxime)silane and the like; aminosilanes such as methyl tris(dimethylamino)silane, methyl tris(diethylamino)silane and the like; amidosilanes such as methyl tris(N-methylacetamido)silane, vinyl tris(N-ethylacetamido)silane and the like; and aminoxysilanes such as methyl tris(dimethylaminoxy)silane, methyl tris(diethylaminoxy)silane and the like. The organopolysiloxane having at least three hydrolyzable groups per molecule can be prepared by the partial (co)hydrolysis of one or more of the above named hydrolyzable organosilane compounds optionally as combined with those silanes giving other types of organosiloxane units followed by (co)condensation. The organopolysiloxane may have a molecular configuration of straight-chain, branched-chain or ring.

The amount of this component (c) in the inventive composition should be in the range from 0.5 to 30 parts by weight per 100 parts by weight of the component (a). Smaller amounts of the component (c) than above may result in an insufficient degree of crosslinking to give decreased mechanical strengths of the cured composition while an excessively large amount of the component (c) over the above range is undesirable due to the excessively high hardness and brittleness of the cured composition in addition to the decreased velocity of the crosslinking reaction.

The component (d) in the inventive composition is an inorganic zinc compound in a powdery form selected from zinc oxide, zinc carbonate and zinc hydroxycarbonate and serves as an oil resistance improv-er in the cured product of the inventive composition. In particular, this component is effective when high oil resistance of the cured composition is desired against a gear oil with admixture of a large amount of an extreme-pressure additive. The zinc oxide is expressed by the formula $ZnO$ and the zinc carbonate is expressed by the formula $ZnCO_3$. A hydroxycarbonate of zinc expressed by the formula $5ZnO.2CO_2.4H_2O$ is also suitable for the purpose. Two kinds or more of these zinc compounds may be used in combination. The zinc compound in the powdery form should preferably have an average particle diameter not exceeding 50 $\mu$m. The amount of this zinc compound in the inventive composition should be in the range from 2 to 200 parts by weight per 100 parts by weight of the component (a) since an amount of the zinc compound smaller than above cannot give sufficiently high oil resistance to the cured product of the composition while an organopolysiloxane composition admixed with the zinc compound in an amount over the above range has poor workability and cannot give sufficiently high mechanical strengths to the cured product.

The organic sulfur compound as the component (e) in the inventive composition serves to further strengthen the oil resistance improving effect of the component (d) and is selected from the class consisting of thiazole compounds, thiuram compounds and dithiocarbamate compounds. Suitable thiazole compounds are exemplified by 2-mercaptobenzothiazole, 2-benzothiazoyl sulfide, N-cyclohexyl-1,2-benzothiazole sulphenamide, zinc salt of 2-mercaptobenzothiazole, N-hydroxydiethylene-2-benzothiazole sulphenamide, 2-(4-morpholyldithio) benzothiazole, sodium salt of 2-mercaptobenzothiazole and the like. The thiuram compounds suitable in the invention are exemplified by tetrabutylthiuram disulfide, tetraethylthiuram disulfide, tetramethylthiuram disulfide, dipentamethylenethiuram tetrasulfide, tetramethylthiuram monosulfide and the like. Further, the dithiocarbamate compounds are exemplified by zinc dibutyl dithiocarbamate, piperidinium pentamethylene dithiocarbamate, zinc diethyl dithiocarbamate, zinc ethylphenyl dithiocarbamate, zinc dimethyl dithiocarbamate, tellurium diethyl dithiocarbamate, sodium dimethyl dithiocarbamate, sodium diethyl dithiocarbamate, sodium dibutyl dithiocarbamate and the like. Although this component (e) is optional in the inventive composition, it is preferable to add from 0.1 to 20 parts by weight of the component (e) per 100 parts by weight of the component (a) in the inventive composition.

The room temperature-curable organopolysiloxane composition of the present invention can be prepared by uniformly blending the above described components in a specified proportion in a dry atmosphere by use of a suitable blending machine of a conventional type. The inventive composition prepared by blending all of the above described components is sufficiently stable and storable when atmospheric moisture is excluded but it is sometimes desirable to prepare a composition storable in two packages, one containing the components (a), (b), (d) and (e) as a mixture and the other containing the component (c), and the contents of these two packages are mixed together directly before use.

When exposed to an atmosphere containing moisture, the composition of the invention is converted into a rubbery elastomer by the crosslinking reaction taking place between the components (a) and (c). The crosslinking reaction can be accelerated by the addition of a known catalyst such as an amine compound, quaternary ammonium salt, organometallic compound, chelate compound of titanium, guanidino-containing compound and the like. Further, the inventive composition may be admixed with a suitable amount of a reinforcing or non-reinforcing filler such as fumed silica, precipitated silica, surface-treated hydrophobic silica, carbon black, titanium dioxide, iron (III) oxide, aluminum oxide, calcium carbonate, quartz powder, diatomaceous earth, calcium silicate, zirconium silicate, talc, bentonite and the like particulate fillers and asbestos, glass fibers, carbon fibers, organic fibers and the like fibrous fillers although the amount thereof should be limited to such a range as not to adversely affect the oil resistance of the rubbery elastomer formed by curing the inventive composition. In addition, the inventive composition may contain various kinds of known additives including coloring agents, heat- and cold-resistance improvers, thixotropy modifiers, dehydrating agents, adhesion aids and the like according to need although the amounts thereof should be limited.

In short, the room temperature-curable organopolysiloxane composition of the invention is imparted with highly improved oil resistance by the unique formulation of the zinc compound as the component (d) as combined with the organic sulfur compound as the component (e) and industrially very advantageous due to the inexpensiveness of each of the components. Owing to the excellent oil resistance and the sealing performance, the inventive composition finds a wide variety of applications such as the FIPG material in the automobile industry and sealing materials in or around engines, transmissions, differential gear boxes and the like in cultivators, construction machines and others as well as the sealing materials in the instruments and machines used or manufactured in building and construction works and electric and electronic industries where contacting with oil is expected.

In the following, examples are given to illustrate the inventive compositions in further detail. In the examples, "parts" in all occurrences refers to "parts by weight" and the values of the viscosity given there are obtained by the measurement at 25° C.

EXAMPLE 1

Three organopolysiloxane compositions I, II and III were prepared each by uniformly blending in a dry atmosphere 100 parts of a dimethylpolysiloxane terminated at both molecular chain ends each with a silanolic hydroxy group and having a viscosity of 5100 centistokes, 10 parts of a methylpolysiloxane composed of monofunctional trimethylsiloxy units $Me_3SiO_{\frac{1}{2}}$ and tetrafunctional siloxane units $SiO_2$ in a molar ratio of 0.7:1, 8 parts of vinyl tri(methylethylketoxime)silane, 0.2 part of dibutyltin dioctoate, 10 parts of a fumed silica filler and a zinc carbonate powder having an average particle diameter of 30 μm in an amount indicated in Table 1 below. For comparison, two more organopolysiloxane compositions IV and V were prepared with the same formulation as above excepting the omission of the methylpolysiloxane (composition IV) or zinc carbonate (composition V).

Each of the above prepared compositions was spread in a sheet-like form of 2 mm thickness and kept standing for 7 days in an atmosphere of 55% relative humidity at 23° C. to be cured into a sheet of rubbery elastomer. These rubber sheets were dipped and kept in an engine oil for automobile (Castle Clean Super 10W-30, a product by Toyota Motors Co.) at 150° C. or a gear oil for automobile (Castle MG Gear Oil Special 75W-90, a product by the same company) at 100° C. or 120° C. for 10 days and the mechanical properties of the rubber sheets after the dipping tests were determined according to the procedure specified in JIS K 6301 to give the results shown in Table 1 which also includes the data for the rubber sheets before dipping in oil.

EXAMPLE 2

An organopolysiloxane composition (composition VI) was prepared by uniformly blending in a dry atmosphere 100 parts of a methylphenylpolysiloxane terminated at both molecular chain ends each with a silanolic hydroxy group and having a viscosity of 19,800 centistokes, of which the molar ratio of the methyl groups to the phenyl groups bonded to the silicon atoms was 90:10, 15 parts of a methylpolysiloxane composed of monofunctional trimethylsiloxy units $Me_3SiO_{\frac{1}{2}}$ and tetrafunctional siloxane units $SiO_2$ in a molar ratio of 0.8:1, 8 parts of vinyl tri(isopropenyloxy)silane, 110 parts of a zinc carbonate powder having an average particle diameter of 30 μm, 7.5 parts of carbon black and 0.5 part of 3-(1,1,3,3-tetramethyl-2-guanidino) trimethoxysilane $(Me_2N)_2C=N-C_3H_6Si(OMe)_3$. Another organopolysiloxane composition (composition VII) was prepared with the same formulation as above except that the zinc carbonate powder was replaced with the same amount of a zinc oxide powder.

TABLE 1

| | | Composition No. | | | | |
|---|---|---|---|---|---|---|
| | | I | II | III | IV* | V |
| Amount of zinc carbonate, parts | | 10 | 30 | 50 | 30 | 0 |
| As cured | Hardness (JIS) | 40 | 42 | 45 | 41 | 31 |
| | Ultimate elongation, % | 300 | 290 | 280 | 310 | 320 |
| | Tensile strength, kg/cm² | 27 | 28 | 30 | 28 | 25 |
| After 10 days in engine oil at 150° C. | Hardness (JIS) | 31 | 40 | 42 | 36 | 21 |
| | Ultimate elongation, % | 320 | 300 | 300 | 320 | 380 |
| | Tensile strength, kg/cm² | 24 | 26 | 27 | 24 | 21 |
| After 10 days in gear oil at 100° C. | Hardness (JIS) | 31 | 37 | 40 | 28 | 18 |
| | Ultimate elongation, % | 300 | 280 | 290 | 330 | 450 |
| | Tensile strength, kg/cm² | 21 | 26 | 27 | 21 | 10 |
| After 10 days in gear oil at 120° C. | Hardness (JIS) | 25 | 30 | 31 | 15 | ** |
| | Ultimate elongation, % | 270 | 280 | 280 | 250 | ** |
| | Tensile strength, kg/cm² | 19 | 22 | 24 | 10 | ** |

*Methylpolysiloxane was omitted.
**Mechanical properties were not measurable due to degradation of the rubber.

Each of the above prepared compositions was shaped and cured into a rubber sheet in the same manner as in Example 1 and the rubber sheets were dipped and kept for 10 days or 30 days at 120° C. in the same gear oil as used in Example 1 (75W-90) or in another gear oil (Castle Gear Oil 80W, a product by Toyota Motors Co.), the latter gear oil containing a smaller amount of the extreme-pressure additive than the former.

The rubber sheets after dipping in oils were subjected to the measurements of the mechanical properties to give the results shown in Table 2 below which also includes the data of the shearing adhesion determined by the testing method described below by use of the testing apparatus schematically illustrated in the accompanying FIGURE by a perspective view. A cold-rolled steel plate 1a according to JIS G 3141 having dimensions of 100 mm×25 mm×1 mm and polished on the surface with a sand paper was placed on a table and coated with the organopolysiloxane composition 2 on a 25 mm×10 mm area at the end portion and another steel plate 1b was put on the layer of the composition 2 with two Teflon spacers 3 having a thickness of 2.0 mm, one on the first steel plate 1a and the other on the table at the opposite sides of the coated area. A pressure plate 4 and a weight 5 of 500 g were put on the second steel plate 1b as shown in the figure and the assembly was kept standing for 96 hours in an atmosphere of 55% relative humidity at 23° C. to effect curing of the composition 2. The thus adhesively bonded steel plates 1a, 1b sandwiching the layer of the cured organopolysiloxane composition 2 were dipped in the gear oil for the specified length of time and at the specified temperatures and then subjected to the measurement of the strength of the shearing adhesion. Meanwhile, Table 2 also includes the data obtained with the composition V prepared in Example 1 and dipped after curing into a rubber sheet in the gear oil 80W under the same conditions as in the tests with the compositions VI and VII.

with the same formulation as above except that the tetramethyl thiuram monosulfide was replaced with the same amount of zinc diethyldithiocarbamate (composition IX) or sodium dimethyldithiocarbamate (composition X).

Each of these organopolysiloxane compositions VIII, IX and X was shaped and cured into a rubber sheet in the same manner as in Example 1 and subjected to the measurements of the mechanical properties either as cured or after dipping in the gear oil 75W-90 at 100° or 120° C. for 10 days to give the results shown in Table 3 below.

TABLE 3

|  |  | Composition No. | | |
|---|---|---|---|---|
|  |  | VIII | IX | X |
| As cured | Hardness (JIS) | 45 | 47 | 44 |
|  | Ultimate elongation, % | 420 | 400 | 390 |
|  | Tensile strength, kg/cm$^2$ | 26 | 28 | 26 |
| After 10 days in gear oil 75W-90 at 100° C. | Hardness (JIS) | 35 | 37 | 34 |
|  | Ultimate elongation, % | 480 | 460 | 430 |
|  | Tensile strength, kg/cm$^2$ | 20 | 22 | 19 |
| After 10 days in gear oil 75W-90 at 120° C. | Hardness (JIS) | 30 | 31 | 28 |
|  | Ultimate elongation % | 510 | 500 | 470 |
|  | Tensile strength, kg/cm$^2$ | 19 | 20 | 18 |

What is claimed is:

1. An oil-resistant, room temperature-curable organopolysiloxane composition which comprises:
   (a) 100 parts by weight of a diorganopolysiloxane having a degree of polymerization of at least 5 and

TABLE 2

|  |  | Composition No. | | |
|---|---|---|---|---|
|  |  | VI | VII | V |
| As cured | Hardness (JIS) | 55 | 58 | 31 |
|  | Ultimate elongation, % | 280 | 250 | 320 |
|  | Tensile strength, kg/cm$^2$ | 31 | 28 | 25 |
|  | Shearing adhesion, kg/cm$^2$ | 21 | 16 | 8.1 |

|  |  | Grade of gear oil | | | | |
|---|---|---|---|---|---|---|
|  |  | 80W | 75W-90 | 80W | 75W-90 | 80W |
| After 10 days in gear oil at 120° C. | Hardness (JIS) | 40 | 31 | 42 | 39 | 14 |
|  | Ultimate elongation, % | 300 | 260 | 270 | 220 | 110 |
|  | Tensile strength, kg/cm$^2$ | 26 | 21 | 25 | 19 | 6 |
|  | Shearing adhesion, kg/cm$^2$ | 18 | 17 | 15 | 12 | 4.2 |
| After 30 days in gear oil at 120° C. | Hardness (JIS) | 38 | 29 | 39 | 36 | * |
|  | Ultimate elongation, % | 280 | 250 | 270 | 200 | * |
|  | Tensile strength, kg/cm$^2$ | 24 | 18 | 23 | 17 | * |
|  | Shearing adhesion, kg/cm$^2$ | 17 | 15 | 15 | 11 | * |

*Mechanical properties were not measurable due to degradation of the rubber.

EXAMPLE 3

An organopolysiloxane composition (composition VIII) was prepared by uniformly blending in a dry atmosphere 100 parts of a dimethylpolysiloxane terminated at both molecular chain ends each with a silanolic hydroxy group and having a viscosity of 19,800 centistokes, 15 parts of a methylpolysiloxane composed of monofunctional trimethylsiloxy units Me$_3$SiO$_{\frac{1}{2}}$ and tetrafunctional siloxane units SiO$_2$ in a molar ratio of 1:1, 8 parts of methyl tri(cyclohexylamino)silane, 60 parts of a zinc hydroxycarbonate powder having an average particle diameter of 20 μm, 20 parts of a zinc oxide powder having an average particle diameter of 30 μm, 5 parts of tetramethyl thiuram monosulfide and 15 parts of a fumed silica filler. Two additional organopolysiloxane compositions (compositions IX and X) were prepared terminated at both molecular chain ends each with a hydroxy group directly bonded to the terminal silicon atom;
(b) from 2 to 30 parts by weight of an organopolysiloxane composed of monofunctional siloxy units expressed by the general formula R$_3$SiO$_{\frac{1}{2}}$, in which R is a substituted or unsubstituted monovalent hydrocarbon group and tetrafunctional siloxane units expressed by the formula SiO$_2$ in a molar ratio of 0.5:1 to 1:1;
(c) from 0.5 to 30 parts by weight of an organosilane or an organopolysiloxane having, in a molecule, at least three hydrolyzable groups bonded to the silicon atom or atoms; and
(d) from 2 to 200 parts by weight of an inorganic zinc compound in a powdery form selected from the class consisting of zinc oxide, zinc carbonate and zinc hydroxycarbonate.

2. The oil-resistant, room temperature-curable organopolysiloxane composition as claimed in claim 1 which further comprises:

(e) from 0.1 to 20 parts by weight of an organic sulfur compound selected from the class consisting of thiazole compounds, thiuram compounds and dithiocarbamate compounds.

3. The oil-resistant, room temperature-curable organopolysiloxane composition as claimed in claim 1 wherein the group denoted by the symbol R in the component (b) is a methyl group.

4. The oil-resistant, room temperature-curable organopolysiloxane composition as claimed in claim 1 wherein the diorganopolysiloxane as the component (a) has a viscosity in the range from 25 to 500,000 centistokes at 25° C.

5. The oil-resistant, room temperature-curable organopolysiloxane composition as claimed in claim 1 wherein the diorganopolysiloxane is a dimethylpolysiloxane or a methylphenylpolysiloxane.

6. The compositions of claim 1 wherein component (a) is an $\alpha,\omega$-dihydroxy diorganopolysiloxane having the formula $$HO\text{-}(SiR_2\text{-}O)_{\overline{n}}OH$$

wherein R is a substituted or unsubstituted monovalent hydrocarbon group and n is a positive integer.

7. The composition of claim 6 wherein R is alkyl, cycloalkyl, alkenyl, or aryl.

8. The composition of claim 6 wherein n is at least 5.

9. The composition of claim 6 wherein the diorganopolysiloxane has a viscosity in the range from 25 to 500,000 centistokes.

10. The composition of claim 1 wherein the hydrolyzable group is an alkoxy, organoketoxime, hydrocarbyl-substituted amino, organoamido, dihydrocarbyl aminoxy or alkenyloxy.

11. The composition of claim 10 wherein the hydrolyzable group is selected from the group consisting of methoxy, ethoxy, propoxy, isopropoxy, butoxy, acetoxime, butanonoxime, dimethylamino, diethylamino, cyclohexylamino, N-methyl acetamide, dimethyl aminoxy, diethyl aminoxy, and isopropenyloxy.

* * * * *